United States Patent [19]

Grundy

[11] 4,044,294
[45] Aug. 23, 1977

[54] CONVERTER-REGULATOR CIRCUIT ARRANGEMENT

[75] Inventor: Reed H. Grundy, Murrysville, Pa.

[73] Assignee: Westinghouse Air Brake Company, Swissvale, Pa.

[21] Appl. No.: 526,514

[22] Filed: Nov. 25, 1974

[51] Int. Cl.² .......................................... H02M 3/335
[52] U.S. Cl. ........................................ 363/25; 363/56
[58] Field of Search .................... 321/11, 18, 2, 10; 323/23; 330/13, 15; 331/109, 113 A; 307/230, 237

[56] References Cited

U.S. PATENT DOCUMENTS

| 3,192,464 | 6/1965 | Johnson et al. | 321/2 |
| 3,327,199 | 6/1967 | Gardner et al. | 321/18 X |
| 3,341,765 | 9/1967 | Rogers, Jr. et al. | 321/18 X |
| 3,435,320 | 3/1969 | Lee et al. | 321/2 |
| 3,564,445 | 2/1971 | Brokaw | 330/15 |
| 3,600,696 | 8/1971 | Grandmont | 330/13 |
| 3,617,857 | 2/1971 | Gunderson | 321/2 |
| 3,670,234 | 6/1972 | Joyce | 321/18 |
| 3,772,606 | 11/1973 | Waehner | 323/23 |
| 3,781,638 | 12/1973 | Anderson et al. | 331/113 A |
| 3,866,063 | 2/1975 | Long | 330/13 X |
| 3,938,023 | 2/1976 | Hutchinson | 321/2 |

OTHER PUBLICATIONS

Instruments & Control Systems, vol. 32, No. 11, pp. 1694, 1695, Nov. 1959.

Primary Examiner—William H. Beha, Jr.
Attorney, Agent, or Firm—J. B. Sotak; R. W. McIntire, Jr.

[57] ABSTRACT

This disclosure relates to a converter-regulator circuit which has high immunity to transient voltages and which employs a feedback controlled operational amplifier at the input end for controlling the conductive condition of an intermediate transistorized inverter which supplies feedback signals from the output end of a bridge rectifier to provide a regulated d.c. output voltage.

9 Claims, 1 Drawing Figure

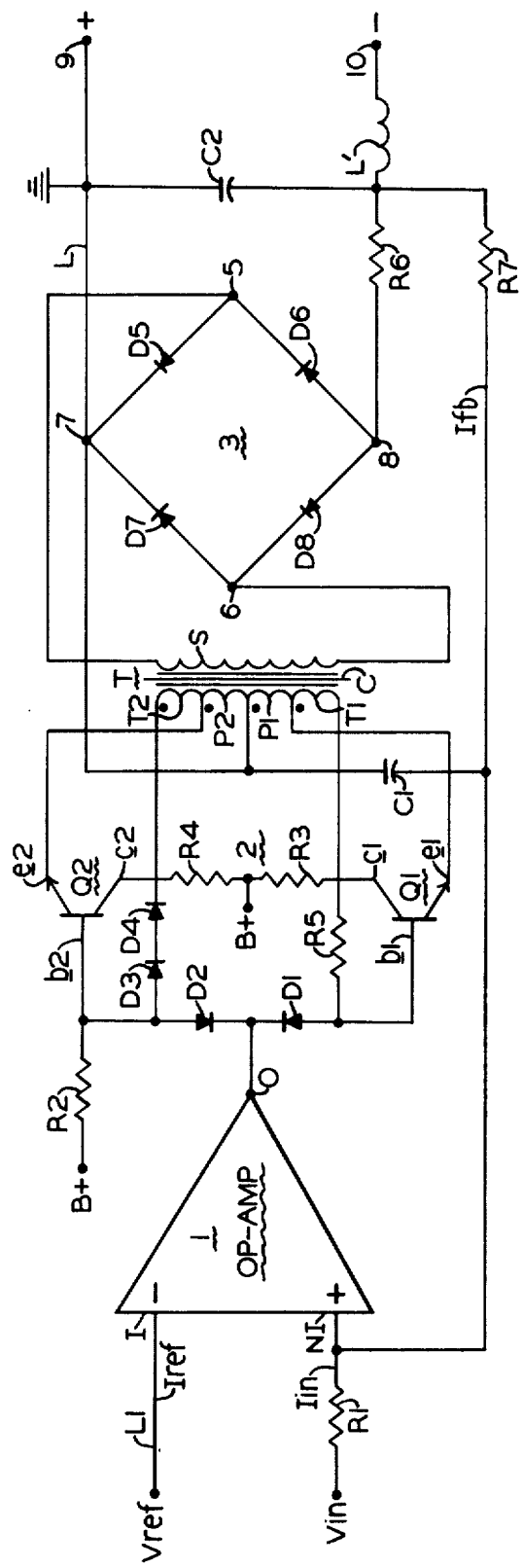

ary or destruction by voltage surges or transients appearing on its output terminals.

CONVERTER-REGULATOR CIRCUIT ARRANGEMENT

SUBJECT OF THE INVENTION

This invention relates to a converter-regulator circuit arrangement which has high immunity to transients that appear in the output end of the converter-regulator and more particularly to an electronic voltage supply circuit employing an integrated circuit differential op-amp for controlling the operating condition of a transistorized inverter which is transformer coupled to a full-wave bridge rectifier which has a portion of its d.c. output fed back to control the electrical state of the integrated circuit for regulating the d.c. output voltage.

BACKGROUND OF THE INVENTION

In various types of signal and control systems for railway and mass and/or rapid transit operations, it is common practice to regulate or control the speed of the moving transit vehicles by modifying the tractive effort exerted by each vehicle of the train. The electrical traction motors on the vehicles are controlled over train lines which extend along the length of the transit vehicles. The traction motors are operated in series, parallel or combinations thereof to vary the tractive effort and in turn the speed of the moving train. The train lines carry various electrical signals to modify or establish the mode of operation of the traction motors on each of the vehicles in order to maintain the speed of the train as selected by the operator or engineer. These electrical signals may take the form of d.c. voltages which have discrete levels or amplitudes each of which signifies the particular mode at which the vehicle motors are to be operated to attain or sustain a given speed. Thus, it is desirable to provide regulated d.c. voltage signals at various discrete levels to obtain the optimum results and the most effective method of controlling operating conditions of the tractive motors. However, prior types of electronic regulators and regulating circuits are not wholly acceptable for usage in providing the necessary discrete d.c. voltages in train speed control equipment due to the presence of high voltage spikes and transients that occur on the train lines. In a conventional solid-state series or parallel regulating circuits, the semiconductive devices or transistors are susceptible to damage and destruction by the appearance of voltage surges or transients on the output end. That is, the output terminals and in turn the semiconductive devices of the previous regulating circuits are directly exposed to the voltage spikes and transients appearing on the train lines so that burned out components and circuit failures are common occurrences. The use of surge protection devices and circuits are not feasible in light weight rapid transit operations due to the additional weight and space requirement and are uneconomical due to the increased costs and maintenance expenses. Thus, there is an essential need for an improved solid-state regulator for use in vehicle speed control equipment which is not susceptible to damage or destruction by voltage surges or transients that may appear on the train lines of railway and mass and/or rapid transit vehicles.

OBJECTS AND SUMMARY OF THE INVENTION

Accordingly, it is an object of this invention to provide a new and improved solid-state voltage regulating circuit which is effectively protected against damage to its active elements by transients.

Another object of this invention is to provide a converter-regulator circuit arrangement which has high immunity to voltage surges developed on its output.

A further object of this invention is to provide an improved converter-regulator circuit for producing a stabilized output voltage by controlling the operating condition of an electronic inverter.

Yet another object of this invention is to provide a unique converter-regulator which is protected against burn-out or damage by voltage transients appearing on its output.

Yet a further object of this invention is to provide a novel conversion-regulation circuit which produces a stabilized output voltage and which has immunity to voltage spikes on its output.

Still another object of this invention is to provide a unique stable converter circuit employing a solid-state inverter which is not readily susceptible to damage or destruction by high voltage surges or transients.

Still a further object of this invention is to provide a converter-regulator circuit arrangement which has high immunity to voltage transients appearing on its output including an amplifier having an input and an output, an inverter electrically coupled to the output of the amplifier, a rectifier having its a.c. input terminals electrically coupled to the inverter and having a pair of d.c. output terminals, and a feedback circuit coupled between the output of the rectifier and the input of the amplifier for controlling the conductive condition of the amplifier and in turn the inverter for regulating the d.c. voltage developed across the pair of d.c. output terminals.

An additional object of this invention is to provide a novel and unique converter-regulator circuit which is economical in cost, simple in construction, reliable in operation, dependable in service and durable in use.

Briefly, in accordance with the present invention, the electronic converter-regulator circuit includes a differential operational amplifier, a transistorized inverter and a full-wave bridge rectifier. The differential operation amplifier is an integral circuit having an inverting and a noninverting input terminal and an output terminal. A source of reference voltage is connected to the inverting terminal while a source of input voltage is connected to the noninverting terminal. The output terminal of the amplifier is connected to the inverter which includes a pair of transistors connected in common-emitter fashion. Normally, the transistors operate in a flip-flop fashion to develop a.c. signals in a center-tapped primary winding of an isolation transformer. The secondary winding of the transformer is coupled to the a.c. input terminals of the full-wave bridge rectifier. The d.c. terminals of the bridge rectifier provide a d.c. output voltage on a pair of output terminals. The d.c. output voltage is stabilized by feeding back a portion of the rectified output voltage to the noninverting input terminal of the operational amplifier. When the d.c. output voltage exceeds a predetermined level, the feedback voltage causes the operational amplifier to clamp the base electrodes of the transistors to ground so that the inverter ceases to produce a.c. signals. When the d.c. output voltage drops below the predetermined level the feedback voltage causes the operational amplifier to unclamp the base electrodes of the transistors so that the inverter reverts to its flip-flop operation to produce a.c. signals in the isolation transformer. The converter-regulator circuit has high immunity to damage by transients appearing on the output terminals due to the absence of any active elements in the output end of the circuit and due to the presence of a choke coil and bypass capacitor in the output end of the circuit.

BRIEF DESCRIPTION OF THE DRAWING

The above-mentioned objects and other attendant features and advantages will be more readily appreciated as the subject invention becomes better understood by reference to the following detailed description when considered in conjunction with the accompanying drawing wherein:

The single figure illustrates a schematic circuit diagram of a preferred embodiment of a unique converter-regulator circuit arrangement of the present invention.

DESCRIPTION OF THE INVENTION

Referring now to the single figure of the drawing, there is shown a preferred embodiment of the converter-regulator circuit arrangement of the subject invention. The converter-regulator circuit is basically composed of an integrated circuit (IC) operational-amplifier (OP-AMP) 1, an electronic inverter 2 and a full-wave bridge rectifier 3.

As shown, the operational amplifier 1 has a pair of input terminals I and NI and a single output terminal O. The operational amplifier 1 is preferably of the differential input signal type of electronic device that is operable by the signal difference between the signals applied to the two input terminals. The input terminal I is termed the inverting or negative input terminal, and a reference voltage level Vr is applied to terminal I via lead L1. The input terminal NI is termed the noninverting terminal or positive input terminal and is connected to a suitable input voltage Vin via resistor R1. The integrated circuit op-amp 1 may be of the type designated 723 which is manufactured and sold by the Fairchild Semiconductor Corporation of Mountainview, California. In operation, the output terminal O will normally provide a positive output voltage when the input voltage Vin is less than the reference voltage Vr. Conversely, when the voltage at the noninverting terminal exceeds the reference voltage at inverting terminal I, the output signal level will assume a more negative value and in the present instance it is designed to go to ground, as will be described hereinafter.

It will be noted from the drawing that the output terminal of the operational amplifier 1 is connected to the solid-state inverting circuit 2. The inverter 2 includes a pair of semiconductive devices or NPN transistors Q1 and Q2 each having a base emitter and a collector electrode. As shown, the output terminal O of the op-amp 1 is connected to the base electrode b1 of transistor Q1 via a diode D1 while the output terminal O is connected to the base electrode b2 of transistor Q2 via a diode D2. It will be noted that the base electrode b2 of the transistor Q2 is connected to the positive voltage terminal B+ of a suitable source of operating potential (not shown) via resistor R2. The collector electrode c1 of transistor Q1 is connected to the positive voltage terminal B+ via current limiting resistor R3 while the collector electrode c2 of the transistor is connected to the positive operating voltage terminal B+ via current limiting resistor R4. The emitter electrodes e1 and e2 of transistors Q1 and Q2, respectively, are connected to the primary winding of a power transformer T. The transformer T includes a magnetic core C upon which are wound primary, secondary and tertiary windings.

As shown, the emitter electrode e1 of transistor Q1 is directly connected to one end of primary winding P1 while the emitter electrode e2 of transistor Q2 is directly connected to one end of primary winding P2. The other ends of primary windings P1 and P2 are connected in common to a center tap point. As shown, the lower end of the tertiary winding T is connected to the base electrode b1 of transistor Q1 via resistor R5 while the upper end of tertiary winding T1 is common to the one end of the primary winding P1. It will be noted that the upper end of of tertiary winding T2 is connected to the base electrode b2 of transistor Q2 via series connected diodes D3 and D4 while the lower end of tertiary winding T2 is common to the upper end of primary winding P2. It will be appreciated that the voltage is stepped-up by the transformer T, and the increased voltage level appears across the secondary winding S.

As shown, the respective ends of the secondary winding S are connected to the a.c. terminals of the full-wave bridge rectifier 3 including the appropriately poled diodes D5, D6, D7 and D8. That is, the upper end of the secondary winding S is connected to the one input terminal 5 of the bridge rectifier 3 while the lower end of the secondary winding S is connected to the other input terminal 6 of the bridge rectifier 3. It will be noted that the rectified voltage will appear across the d.c. output terminals 7 and 8 of the bridge rectifier 3. It will be appreciated that the terminal 7 is directly connected to the negative output terminal 9 via lead L which is common or ground. The common lead L is also connected to the center tap of the primary windings P1 and P2. The d.c. output terminal 8 of the rectifier 3 is connected to the positive output terminal 10 via resistor R6 and choke or inductor L'. A filtering capacitor C2 is connected across the output terminals 9 and 10 to remove unwanted a.c. ripple and pulsations from the rectified voltage and to provide a smooth output. In practice, the terminals 9 and 10 provide a connection point to which the train line is attached by a well known method. It will be appreciated that C2 and L' provide transient protection against high voltage surges which may appear on the output terminals 9 and 10 or the train line.

It will be seen that a d.c. feedback path is connected from the negative output terminal 10 of the bridge rectifier 3 to the noninverting input terminal NI of the differential operational amplifier.

A filtering capacitor C1 is connected from the feedback circuit to the center tap of transformer T and in turn to ground via lead L.

Turning now to the operation of the present invention, it will be assumed that all the components and elements are intact and that the operating voltage, the reference voltage and the input voltage are applied to the appropriate points of the converter-regulator circuit. Under these conditions, the current supplied to the inverting terminal I by the reference voltage Vr is greater than the current supplied to the noninverting terminal by the input voltage Vin. Thus, the voltage on the output terminal O of the op-amp 1 is high or positive with respect to ground, and therefore the inverter 2 is allowed to operate in a flip-flop fashion. For example, current begins to flow from the B+ terminal, through resistor R2, forward voltage drop of diodes D3 and D4, and windings T2 and P2 to ground which thereby causes the transistor Q2 to be forwardly biased. The conduction of transistor Q2 causes current to flow through its output, namely, resistor R4, collector-emitter $c2 - e1$, and the primary winding P2 of transformer T. The current flowing through primary winding P2 induces a voltage into secondary winding S and also induces a voltage into tertiary winding T1 which reverse biases the base-emitter electrodes $b1 - e1$ of transistor Q1 and ensures that Q1 is nonconducting when Q2 is conducting. Current will continue to flow through the primary winding P2 until the transformer T reaches saturation at which time the flux in the transformer will cease changing and cause a decrease in the voltage developed in tertiary winding T1 which will ultimately forwardly bias the transistor Q1 and back bias transistor Q2. The conduction of transistor Q1 causes current to flow in primary winding P1 which induces a reverse voltage in secondary winding S and in tertiary winding T2. The voltage induced in tertiary winding T2 ensures that the transistor Q2 is nonconductive during the conduction of transistor Q1. The transistor Q1 will continue to conduct current until the transformer T again saturates at which time the induced voltage will begin to decay and cause a forward biasing voltage to be developed by tertiary winding T2 so that the transistor Q2 again becomes conductive. It will be appreciated that the alternate conduction or flip-flop action transistors Q1 and Q2 will continue so that a.c. voltage will be induced into the secondary winding S by the primary and secondary windings P1 and P2, respectively. The a.c. voltage is rectified by the diodes D6, D7 and D8, D5 so that the capacitor C2 will be charged through the resistor R6. The build up of voltage on the capacitor will continue until the desired d.c. output voltage level appearing across terminals 9 and 10 is reached. It will be appreciated that during the voltage build-up period a certain amount of current is fed back through the relatively large resistor R7 to the noninverting input terminal NI of differential amplifier 1. At the desired or preselected d.c. output voltage level, the sum of the feedback current Ifb and the input current Iin is sufficient to exceed the reference current Iref flowing to inverting terminal I. Thus, when the current flowing into terminal NI exceeds the current flowing into terminal I, the op-amp 1 is triggered so that the output terminal O is effectively grounded. The grounding of the output terminal O causes both the base electrode $b1$ and the base electrode $b2$ to be clamped to ground through the diodes D1 and D2, respectively. This clamping action renders the conducting transistor nonconductive and prevents both transistors from becoming conductive. Thus, the flip-flop or multivibrator action of the inverter 2 ceases so that alternating current voltage in secondary winding S ceases and the bridge rectifier 3 discontinues to charge capacitor C2. Thus, the d.c. voltage developed across capacitor C2 and appearing on terminals 9 and 10 begins to decrease. When the decreasing output voltage reaches the preselected value, the feedback current I$fb$ plus the intput current Iin will be less than the reference current Iref so that op-amp 1 will revert to its original condition and produce a positive voltage on output terminal O. The appearance of the positive voltage on terminal O will reestablish the astable or flip-flop action of the inverter 2 so that a.c. voltage is again induced in secondary winding S which is rectified by rectifier 3 to charge capacitor C2. Thus, the d.c. voltage appearing across terminals 9 and 10 is stabilized and regulated by controlling the flip-flop action of the inverter 2.

It will be noted that the sensitive elements of the circuit, namely, the integrated circuit operational amplifier 1 and the transistors Q1 and Q2 are not susceptible to damage by high voltage transient that may appear on the train line and in turn on output terminals 9 and 10. It will be noted that inductor L1 and capacitor C2 provide isolation for transistors Q1 and Q2 and the diodes of the bridge rectifier short circuit and block the transients or surges developed in the train line. The high value of resistor R7 prevents the spikes from damaging the positive input of the differential op-amp 1. Thus, the presently described converter-regulator circuit is not adversely effected by transients or voltage spikes that may be developed on output terminals 9 and 10 which ensures a higher and more reliable degree of operation. It will be appreciated that while the present invention finds particular utility in the speed control systems for railway and mass and/or rapid transit operations, it is understood that the invention may be employed in other equipment and apparatus which have need of its unique operation.

In addition, it will be readily evident that this invention may be employed in other systems and installations, such as, security, signaling, communication, telemetry, etc., which require the immunity from high voltage transients or surges in their output.

Additionally, it will be understood that other changes, modifications and alterations may be made without departing from the spirit and scope of this invention. For example, the NPN transistors may be replaced by PNP transistors simply by reversing the supply voltage and polarity of the diodes. Further, the polarity of the output voltage may be changed by reversing the polarity of the diodes of the bridge rectifier 3. In addition, it will be appreciated that other types of amplifiers or op-amps may be employed in practicing the invention. It will be appreciated that the integrated circuit may be replaced by a conventional transistorized amplifier circuit. Also, other types of multivibrators may be utilized in practicing the present invention. Thus, it is understood that the showing and description of the present invention should be taken in an illustrative or diagrammatic sense only.

Having now described the invention, what I claim as new and desire to secure by Letters Patent is:

1. A converter-regulator circuit arrangement which has high immunity to voltage transients appearing on its output comprising, an amplifier having a first and a second input and an output, as reference voltage coupled to said first input, an input voltage coupled to said second input, an inverter electrically coupled to the output of said amplifier, a rectifier having its a.c. input terminals electrically coupled to said inverter and having a pair of d.c. output terminals, a feedback circuit coupled between one of said pair of d.c. output terminals of said rectifier by a feedback resistor and providing a feedback voltage to said second input of said amplifier for controlling the conductive condition of said amplifier and in turn for causing said amplifier to clamp said inverter to ground by rendering a pair of diodes conductive and for causing said amplifier to unclamp said inverter from ground by rendering said pair of diodes nonconductive for regulating the d.c. voltage developed across said pair of d.c. output terminals, and a transient protection circuit including a bypass capacitor coupled across said pair of d.c. output terminals and an inductive choke connected by a series resistor to said one of said pair of d.c. output terminals for preventing voltage transients from damaging said amplifier and said inverter by providing that said rectifier short circuits the voltage transients to ground, and by providing that said bypass capacitor and said inductive choke isolates said inverter from the voltage transients and by providing that said feedback resistor decreases the magnitude of the voltage transients appearing on said second input of said amplifier.

2. The converter-regulator circuit arrangement as defined in claim 1, wherein said amplifier is a differential operational amplifier.

3. The converter-regulator circuit arrangement as defined in claim 1, wherein said inverter includes a pair of transistors connected in common-collector configuration.

4. The converter-regulator circuit arrangement as defined in claim 1, wherein a transformer couples said inverter to said rectifier.

5. The converter-regulator circuit arrangement as defined in claim 1, wherein said rectifier is a full-wave bridge rectifier network.

6. The converter-regulator circuit arrangement as defined in claim 1, wherein said inverter includes a first and a second transistor connected in emitter follower fashion.

7. The converter-regulator circuit arrangement as defined in claim 4, wherein said transformer includes a center tapped primary winding and a secondary winding.

8. The converter-regulator circuit arrangement as defined in claim 2, wherein said differential operational amplifier includes an inverting and a noninverting input terminal.

9. the converter-regulator circuit arrangement as defined in claim 1, wherein said transformer includes a pair of primary windings, a pair of tertiary windings and a secondary winding.

* * * * *